US009706463B2

United States Patent
Teixeira de Magalhaes et al.

(10) Patent No.: US 9,706,463 B2
(45) Date of Patent: Jul. 11, 2017

(54) WIRELESS COMMUNICATION DEVICE CONTROL OF WIRELESS COMMUNICATION ACCESS SYSTEMS

(71) Applicant: Sprint Communications Company L.P., Overland Park, KS (US)

(72) Inventors: Joao Carlos Osorio Gouvea Teixeira de Magalhaes, Shawnee, KS (US); Lyle Walter Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/072,707

(22) Filed: Mar. 17, 2016

(65) Prior Publication Data

US 2017/0048771 A1 Feb. 16, 2017

Related U.S. Application Data

(63) Continuation of application No. 14/825,424, filed on Aug. 13, 2015, now Pat. No. 9,326,206.

(51) Int. Cl.
*H04W 36/00* (2009.01)
*H04W 36/14* (2009.01)
*H04W 4/24* (2009.01)
*H04W 48/18* (2009.01)
*H04W 72/06* (2009.01)
*H04W 76/04* (2009.01)

(52) U.S. Cl.
CPC .......... *H04W 36/14* (2013.01); *H04W 4/24* (2013.01); *H04W 48/18* (2013.01); *H04W 72/06* (2013.01); *H04W 76/046* (2013.01)

(58) Field of Classification Search
CPC ..... H04W 36/30; H04W 36/18; H04W 36/08; H04W 36/14
USPC .............. 455/436, 442, 432.1, 435.1, 422.1; 370/331
See application file for complete search history.

(56) References Cited

U.S. PATENT DOCUMENTS

| | | | |
|---|---|---|---|
| 6,016,427 A | 1/2000 | Barber et al. | |
| 6,404,869 B1 | 6/2002 | Henderson et al. | |
| 6,625,451 B1 | 9/2003 | La Medica, Jr. et al. | |
| 6,684,082 B1 | 1/2004 | McClure | |

(Continued)

FOREIGN PATENT DOCUMENTS

| | | |
|---|---|---|
| CA | 2515819 A1 | 8/2004 |
| WO | 2015000533 | 1/2015 |

*Primary Examiner* — Nghi H Ly

(57) ABSTRACT

A wireless communication network enables a user to select data communication accounting systems. A wireless communication device attaches to a wireless access system, and the wireless access system transfers network data characterizing Billing Identifiers (BIDs) to the wireless communication device. The wireless communication device processes the network data in combination with a user-prioritized list of accounting names to select one of the BIDs. The wireless communication device transfers the selected BID to the wireless access system, and the wireless access system directs a gateway system to use the selected BID for the wireless communication device. The gateway system exchanges user data for the wireless communication device and transfers usage data to the data communication accounting systems that is identified by the selected BID.

20 Claims, 8 Drawing Sheets

(56) References Cited

U.S. PATENT DOCUMENTS

| | | |
|---|---|---|
| 7,869,826 B2 | 1/2011 | McElwain et al. |
| 8,019,330 B2 | 9/2011 | Phillips et al. |
| 8,194,646 B2 | 6/2012 | Elliott et al. |
| 8,467,766 B2* | 6/2013 | Rackley, III ......... G06Q 20/042 455/406 |
| 9,037,109 B1 | 5/2015 | Singh et al. |
| 2002/0009978 A1 | 1/2002 | Dukach et al. |
| 2002/0164962 A1 | 11/2002 | Mankins et al. |
| 2004/0077334 A1* | 4/2004 | Joyce ..................... G06Q 20/00 455/406 |
| 2008/0096559 A1 | 4/2008 | Phillips et al. |
| 2012/0239417 A1* | 9/2012 | Pourfallah ............. G06Q 50/22 705/2 |
| 2013/0024331 A1 | 1/2013 | Pulley et al. |
| 2013/0137464 A1 | 5/2013 | Kramer et al. |

\* cited by examiner

WIRELESS COMMUNICATION DEVICE CONTROL OF WIRELESS COMMUNICATION ACCESS SYSTEMS

RELATED CASES

This patent application is a continuation of U.S. patent application Ser. No. 14/825,424 that was filed on Aug. 13, 2015 and is entitled, "WIRELESS COMMUNICATION DEVICE CONTROL OF WIRELESS COMMUNICATION ACCESS SYSTEMS." U.S. patent application Ser. No. 14/825,424 is hereby incorporated by reference into this patent application.

TECHNICAL BACKGROUND

Wireless communication devices include wireless access systems which provide a user device wireless access to communication services over wireless links. Wireless communication systems exchange user communications between wireless communication devices and service providers for the communication services. Communication services include voice calls, data exchange, web pages, streaming media, or text messages, among other communication services.

User devices, such as phones and computers, identify networks, access system, and accounting systems broadcasted by base stations. System identifiers (SIDs) indicate wireless communication access systems and billing identifiers (BIDs) indicate a data communication accounting systems. SIDs may indicate a home access system, a visited or roaming access system, or some other third party access system. BIDs may be an account which is linked to a user's wireless service provider, a third party billing company, or a prepaid account.

A user typically determines which wireless communication access systems are preferred, allowed, or restricted based on contracted agreements with service providers. The user also typically pre-authorizes specific accounts which may be used for billing purposes. However, a user may want to use a specific wireless communication access system and data communication accounting system in different locations or at different times. Unfortunately, there is not an effective or efficient way for a user to switch between preferred wireless communication access systems and data communication accounting systems on their wireless communication device.

TECHNICAL OVERVIEW

A wireless communication network enables a user to select data communication accounting systems. A wireless communication device attaches to a wireless access system, and the wireless access system transfers network data characterizing Billing Identifiers (BIDs) to the wireless communication device. The wireless communication device processes the network data in combination with a user-prioritized list of accounting names to select one of the BIDs. The wireless communication device transfers the selected BID to the wireless access system, and the wireless access system directs a gateway system to use the selected BID for the wireless communication device. The gateway system exchanges user data for the wireless communication device and transfers usage data to the data communication accounting systems that is identified by the selected BID.

DETAILED DESCRIPTION

Figure 1:
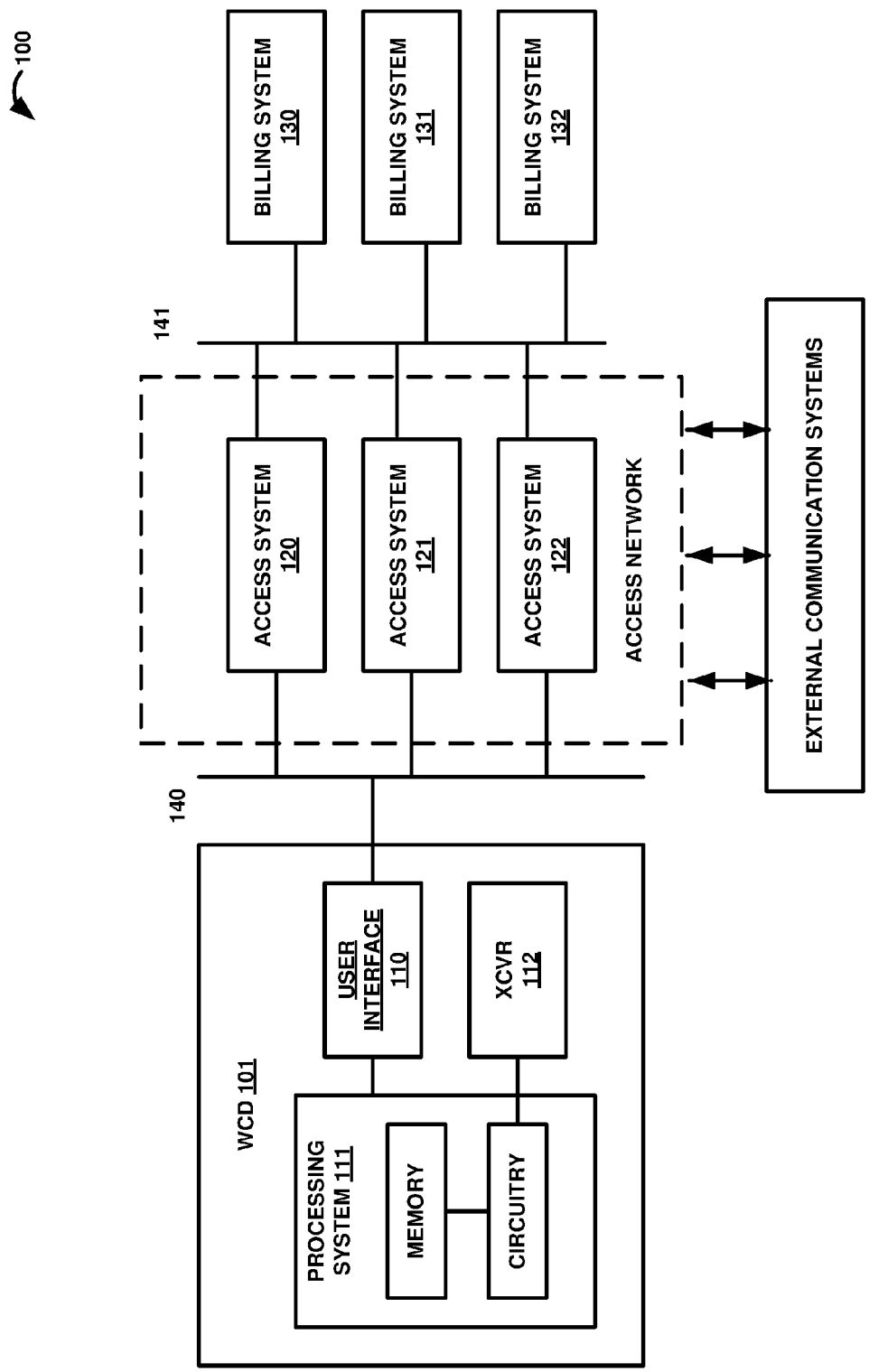
FIGS. 1-3 illustrate a communication system to control wireless communication access systems individually identified by network names and by (System Identifiers) SIDs and to control data communication accounting system individually identified by accounting names and by BIDs (Billing Identifiers).

FIG. 1 illustrates communication system 100 to control wireless communication access systems individually identified by network names and by System Identifiers (SIDs) and to control data communication accounting system individually identified by accounting names and by Billing Identifiers (BIDs). Communication system 100 comprises wireless communication device (WCD) 101, wireless access network, and external communication systems. Wireless access network includes wireless communication access systems 120-122 and data communication accounting systems 130-132. WCD 101 includes user interface 110, data processing system 111, and wireless communication transceiver 112. WCD 101 communicates with wireless communication access systems 120-122 over wireless link 140. Wireless access network communicates with data communication accounting systems 130-132 and external communication systems over communication link 141.

Wireless communication access systems 120-122 allow a user of WCD 101 to make and receive voice calls, send and receive data, or access other services. Wireless communication access system 120-122 may be a home access system, a visited or roaming access system, a third party provider access system, and the like. For example, a user may have a contract with home access system 120. The user may use home access system 120 for no additional cost when accessible but use preferred roaming access system 121 when home access system 120 is unavailable. A user may also use corporate access system 122 for work related communication services. In some examples, one or more of wireless communication access systems 120-122 may be unknown or restricted by WCD 101.

Data communication accounting systems 130-132 collect data on WCD service consumption, calculate charging and billing information, and produce and process user bills. Data communication accounting systems 130-132 may be an account linked to a home access system or a roaming access system, a prepaid account, a third party accounting service provider, or some other accounting system. For example, home accounting system 130 may be associated with home access system 120 and a user may determine accounting terms and conditions to be used in calculating billing data based on an agreement with the home service provider. In other instances, a user may decide to prepay for a billing system, such as prepay accounting system 131 in which the user can use any one of wireless communication access systems 120-122 and bill prepay accounting system 131 until the prepaid amount runs out. Data communication accounting systems 130-132 could also be a third party accounting system, such as a corporate or government sponsored accounting system. For example, corporate accounting system 132 may be charged and paid by a corporation that is not a wireless communication company, but sponsors the use of one or more of wireless communication access systems 120-122 by WCD 101.

In a first operation, WCD 101 graphically displays the network names and the accounting names. Network names identify the individual wireless communication access systems 120-122. Accounting names identify the individual data communication accounting systems 130-132. Network names and accounting names may be displayed each time the user initiates a media session or vary depending on time of day and location of WCD 101. For example, a user may use home access system 120 in the evening and on the weekends, corporate access system 122 during normal working hours, and preferred roaming access system 121 while on vacation.

In response to graphically displaying the network names and the accounting names, WCD 101 receives user inputs indicating a user-priority for the network names and the accounting names. User-priority information may indicate a preference or restriction on which one of wireless communication access systems 120-122 should be utilized. User-priority information may be used on a per session basis or may be stored in the phone for future use. For example, a user may be on vacation and input data indicating that preferred roaming access system 121, which is exclusively designated for hotel guests, should be used for the next week.

In a next operation, WCD 101 wirelessly attaches to a first one of wireless communication access systems 120-122 having a first one of the network names and a first one of the SIDs, and responsively receives network data characterizing the SIDs and the BIDs. For example, WCD 101 may automatically attach to home access system 120 when powered on. WCD 101 would then receive network data characterizing the SID associated with home access system 120 and the BID associated with home accounting system 130.

WCD 101 digitally processes the network data characterizing the SIDs and the BIDs in combination with the user-priority for the network names and the accounting names to determine a second one of the SIDs for a second one of wireless communication access systems 120-122. For example, WCD 101 may receive network data characterizing the SID associated with home access system 120 and the BID associated with home accounting system 130. However, the user-priority may indicate that for the next week WCD 101 should use preferred roaming access system 121 instead. WCD 101 would then determine a second SID for preferred roaming access system 121.

In response to digitally processing the network data with the user-priority to determine a second one of the SIDs, WCD 101 wirelessly attaches to the second one of wireless communication access systems 120-122 having the second one of the SIDs and displaying the second one of the network names for the second one of the wireless communication access systems 120-122. For example, in response to determining the SID for preferred roaming access system 121, WCD 101 would then attach to preferred roaming access system 121 and display the network name for preferred roaming access system 122 to the user.

In a final operation, WCD 101 wirelessly exchanges user data with the second one of wireless communication access systems 120-122. In this example, WCD 101 would now be able to make a voice call or stream data over preferred roaming access system 121 and will be restricted from using other roaming access systems which may be associated with a lower quality of service and higher costs.

In some examples, the first one of wireless communication access systems 120-122 has a first one of the BIDs. WCD 101 then digitally processes the network data characterizing the SIDs and the BIDs in combination with the user-priority for the network names and the accounting names to determine a second one of the BIDs for the second one of wireless communication access systems 120-122. In response, WCD 101 displays the second one of the accounting names for the second one of data communication accounting systems 130-132. For example, a user may indicate that prepaid accounting system 131 is a user-priority when using preferred roaming access system 121. WCD 101 would then process the network data and the user-priority to determine the BID associated prepaid accounting system 131.

In some examples, WCD 101 receives network data characterizing the SIDs and the BIDs in Long Term Evolution (LTE) System Information Block (SIB) data. For example, the LTE SIB data characterizing the SID associated with home access system 120 and the BID associated with home accounting system 130 may be broadcast by an evolved Node B (eNodeB) to WCD 101. In other examples, WCD 101 receives the network data characterizing the SIDs and the BIDs in LTE Non-Access Stratum (NAS) data. For example, a network controller, such as a Mobility Management Entity (MME), may query a Home Subscriber Server (HSS) to pick an Access Point Name (APN) for the SID associated with home access system 120 and the BID associated with home accounting system 130, and order a Packet Data Gateway (P-GW) or Policy and Charging Rules Function (PCRF) to use the SID associated with home access system 120 and the BID associated with home accounting system 130 for a media session. In this example, the MME would then transfer the network data characterizing the SIDs and the BIDs in LTE NAS data to WCD 101 through an eNodeB.

In some examples, WCD 101 wirelessly attaches to the first one of wireless communication access systems 120-122 by transferring an LTE Radio Resource Control (RRC) establishment cause indicating a SID translation request. In other examples, WCD 101 wirelessly attaches to the first one of wireless communication access systems 120-122 by transferring an LTE RRC establishment cause indicating a BID translation request. For example, an LTE RRC message transferred to the eNodeB from WCD 101 during attachment may indicate that the SID associated with corporate access system 122 and the BID associated with corporate accounting system 132 are requested to be used, such as when a user would like to charge the data usage for a business related media session to a corporate employee account.

In some examples, WCD 101 wirelessly attaches to the first one of wireless communication access systems 120-122 by transferring LTE NAS data indicating a SID translation request. In other examples, WCD 101 wirelessly attaches to the first one of wireless communication access systems 120-122 by transferring LTE NAS data indicating a BID translation request. For example, an LTE NAS message transferred to an MME from WCD 101 over an eNodeB may indicate that the SID associated with a government access system and a BID associated with a government accounting system are requested to be used for selected services.

In some examples, the first one of wireless communication access systems 120-122 comprises an LTE eNodeB. In some examples, WCD 101 comprises LTE User Equipment (UE).

Figure 2:
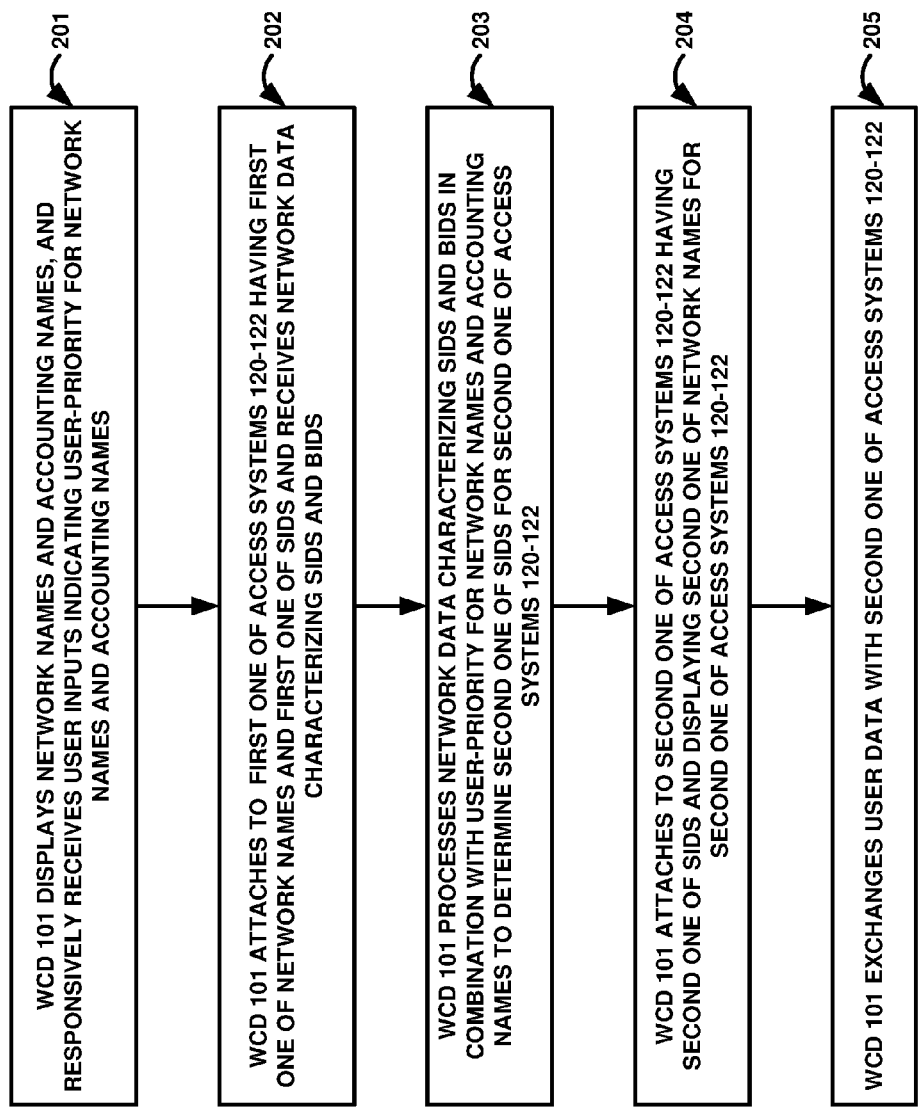

FIG. 2 is a flow diagram illustrating an operation of communication system 100 to control wireless communication access systems individually identified by network names and by SIDs and to control data communication accounting systems individually identified by accounting names and by BIDs. WCD 101 graphically displays (201) the network names and the accounting names and responsively receives (201) user inputs indicating a user-priority for the network names and the accounting names. WCD 101 wirelessly attaches (202) to a first one of wireless communication access systems 120-122 having a first one of the network names and a first one of SIDs and responsively receives (202) network data characterizing SIDs and BIDs.

Still referring to FIG. 2, WCD 101 digitally processes (203) the network data characterizing SIDs and BIDs in combination with the user-priority for the network names and the accounting names to determine a second one of SIDs for a second one of wireless communication access systems 120-122. In response, WCD 101 wirelessly attaches (204) to the second one of the wireless communication access systems 120-122 having the second one of the SIDs and displays (204) the second one of the network names for the second one of wireless communication access systems 120-122. WCD 101 wirelessly exchanges (205) user data with the second one of wireless communication access systems 120-122.

Figure 3:
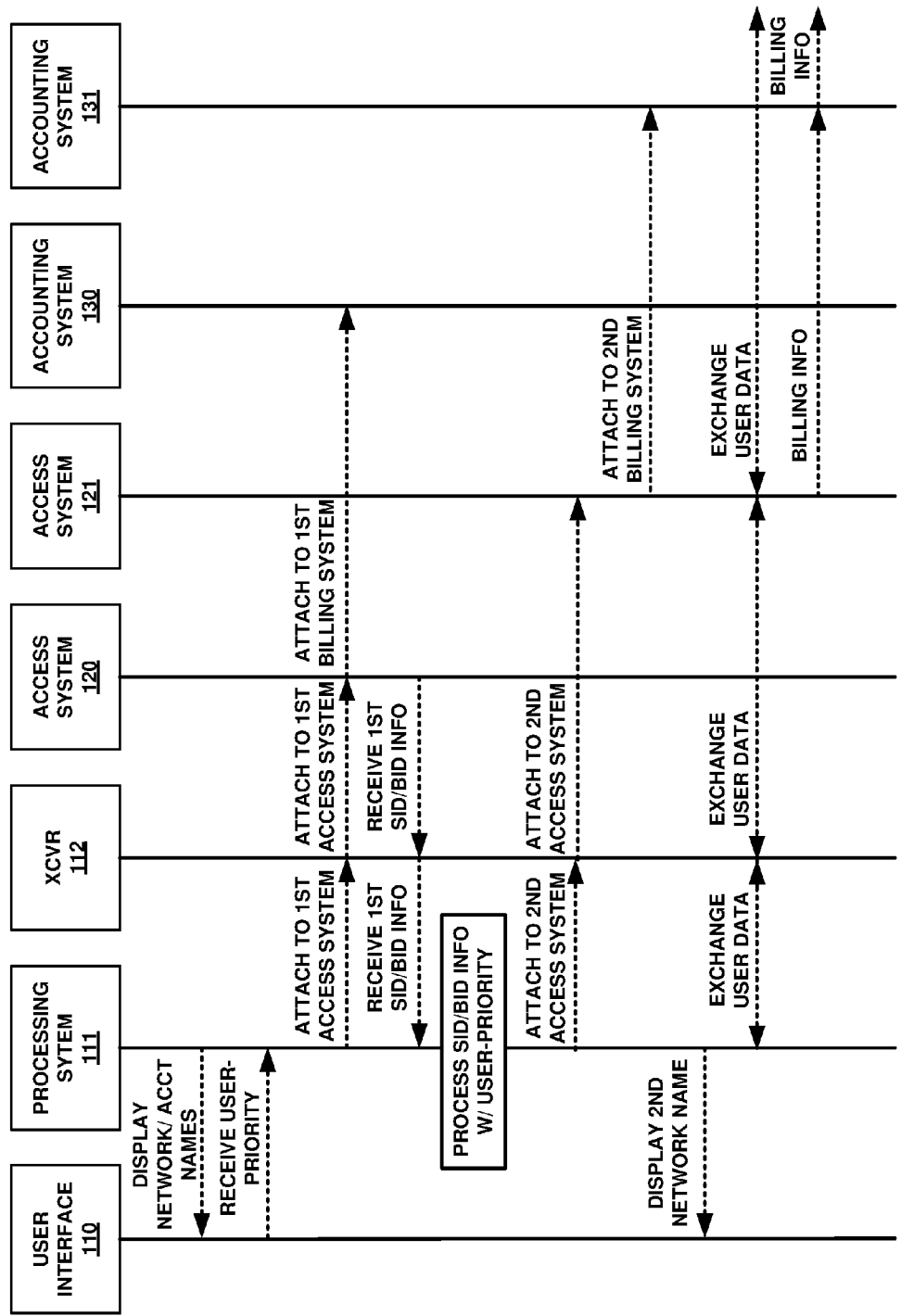

FIG. 3 is a sequence diagram illustrating the operation of communication system 100 to control wireless communication access systems individually identified by network names and data communication accounting systems individually identified by accounting names. Data processing system 111 drives user interface 110 to graphically display the network names and the accounting names. In response, user interface 110 receives user inputs indicating a user-priority for the network names and the accounting names.

Data processing system 111 drives communication transceiver 112 to wirelessly attach to wireless communication access system 120. In response, communication transceiver 112 receives network data characterizing the SIDs and the BIDs from wireless communication access system 120 and transfers the network data to data processing system 111. Wireless communication access system 120 may then attach to data communication accounting system 130.

Data processing system 111 then digitally processes the network data characterizing the SIDs and the BIDs in combination with the user-priority for the network names and the accounting names to determine a second one of the SIDs associated with wireless communication access system 121. In response, data processing system 111 drives communication transceiver 112 to wirelessly attach to wireless communication access system 121. Wireless communication access system 121 may then attach to data communication accounting system 131. Wireless communication access system 121 can then transfer billing information to data communication accounting system 131.

Data processing system 111 then drives user interface 110 to display a second one of the network names for wireless communication access system 121. Data processing system 111 also drives communication transceiver 112 to wirelessly exchange user data with wireless communication access system 121.

Figure 4:
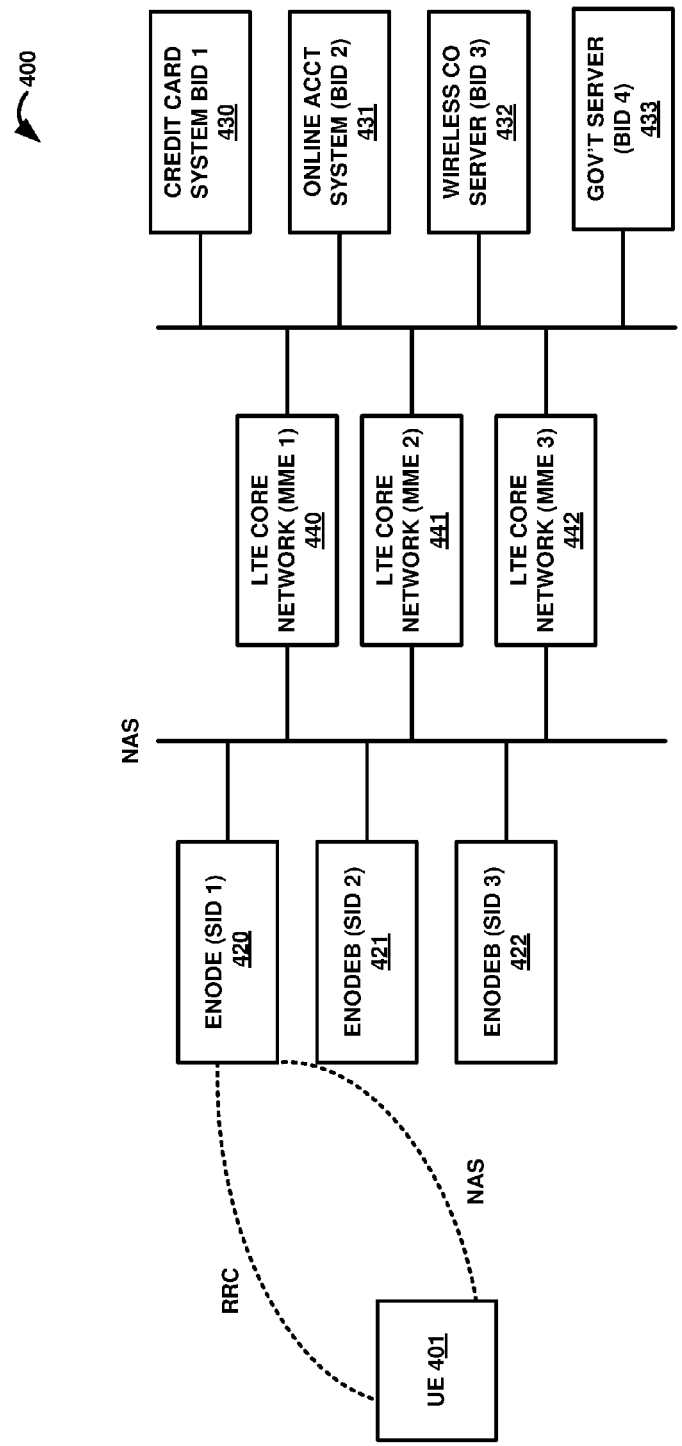
FIGS. 4-7 illustrate a Long Term Evolution (LTE) communication system to control wireless communication access systems individually identified by network names and by SIDs and to control data communication accounting system individually identified by accounting names and by BIDs.

FIG. 4 illustrates LTE communication system 400 to control wireless communication access systems individually identified by network names and by SIDs and to control data communication accounting systems individually identified by accounting names and by BIDs. LTE communication system 400 is an example of communication system 100, although LTE communication system 400 may use alternative configurations and operations. LTE communication system 400 comprises UE 401, eNodeBs 420-422 associated with SIDs 1-3 respectively, LTE core networks 440-442 associated with MMEs 1-3 respectively, and data communication accounting systems 430-433 associated with BIDs 1-3 respectively. In this embodiment, data communication accounting systems 430-433 include credit card system 430 having BID 1, online accounting system 431 having BID 2, wireless company server 432 having BID 3, and government server 433 having BID 4.

Figure 5:
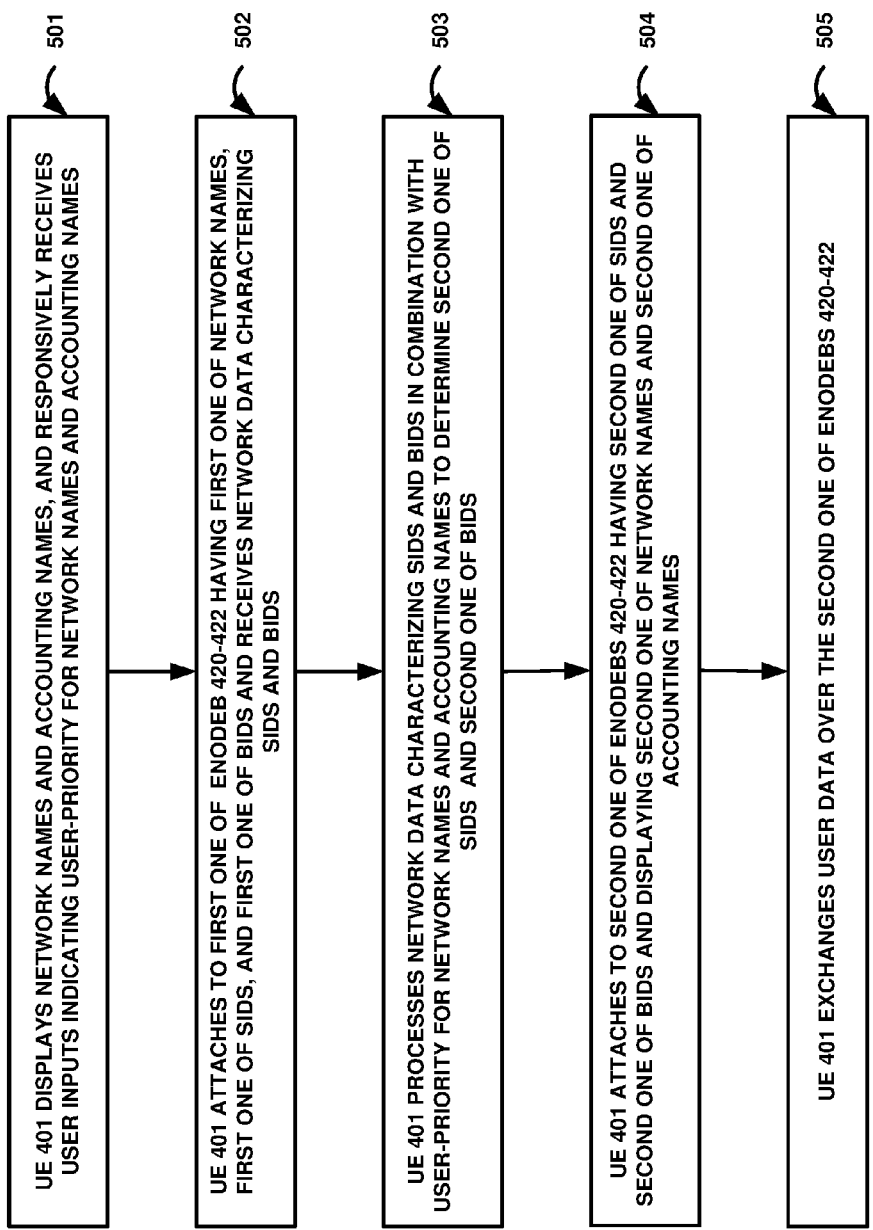

FIG. 5 is a flow diagram illustrating an operation of communication system 400 to control wireless communication access systems individually identified by network names and by SIDs and to control data communication accounting systems individually identified by accounting names and by BIDs. UE 401 graphically displays (501) the network names and the accounting names and responsively receives (501) user inputs indicating a user-priority for the network names and the accounting names. UE 401 wirelessly attaches (502) to a first one of eNodeBs (SID 1-3) 420-422 having a first one of the network names, a first one of SIDs, and a first one of BIDs and responsively receives (502) network data characterizing SIDs and BIDs.

Still referring to FIG. 5, UE 401 digitally processes (503) the network data characterizing SIDs and BIDs in combination with the user-priority for the network names and the accounting names to determine a second one of the SIDs for a second one of eNodeBs (SID 1-3) 420-422 and second one of the BIDs associated with a second one of data communication accounting systems 430-432. In response, UE 401 wirelessly attaches (504) to the second one of eNodeBs (SID 1-3) 420-422 having the second one of the SIDs and the second one of the BIDs. UE 401 graphically displays (504) the second one of the network names and the second one of the account names. UE 401 wirelessly exchanges (505) user data over the second one of eNodeBs (SID 1-3) 420-422.

Figure 6:
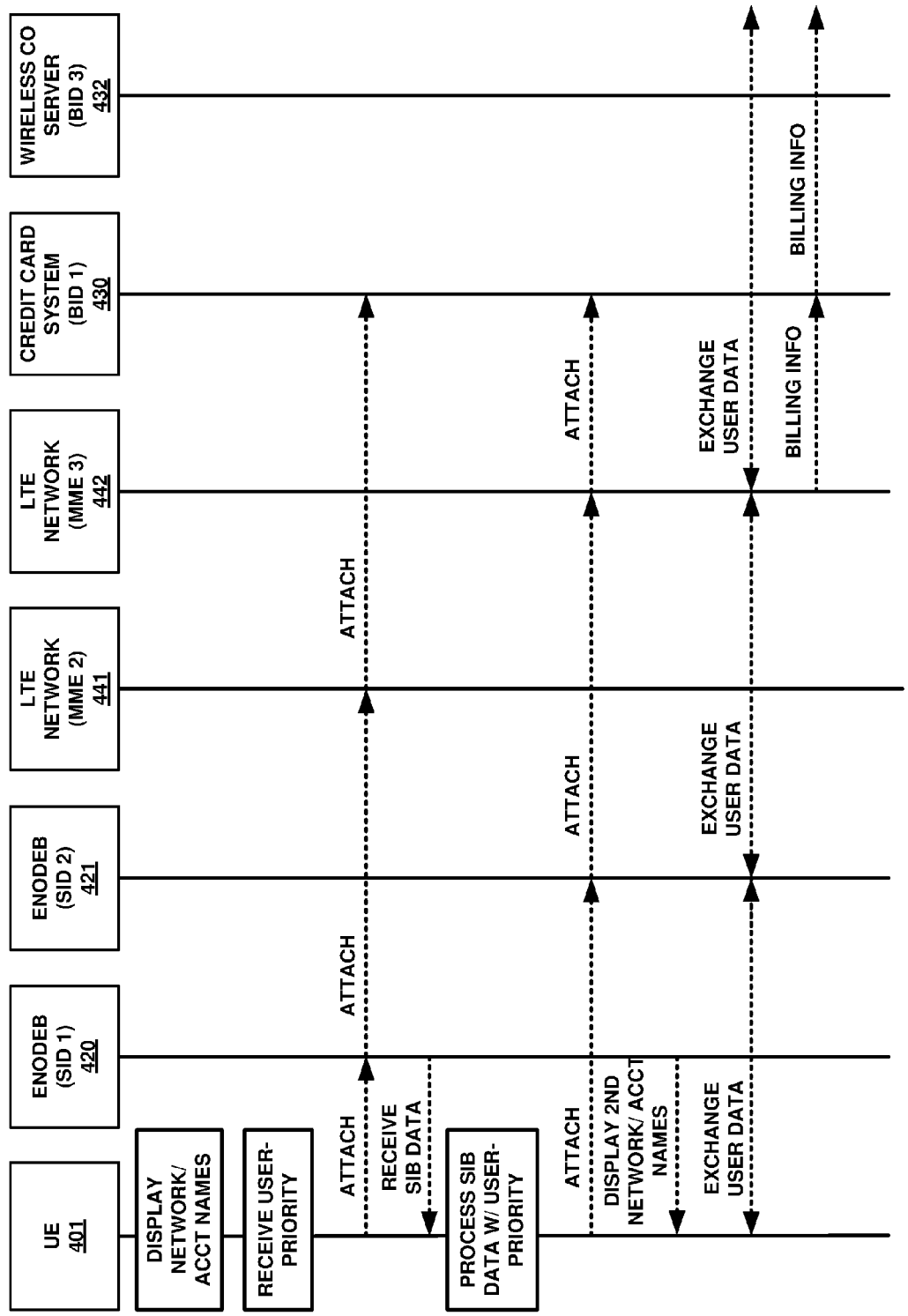

FIG. 6 is a sequence diagram illustrating an example embodiment of the operation of communication system 400 to control wireless communication access systems individually identified by network names and SIDs and to control data communication accounting systems individually identified by accounting names and by BIDs. First, UE 401 graphically displays the network names and the accounting names to the user. In response, UE 401 receives user inputs indicating a user-priority for the network names and the accounting names.

Still referring to FIG. 6, UE 401 wirelessly attaches to LTE core network (MME 2) 441 via eNodeB (SID 1) 420. Although not illustrated, LTE core network (MME 2) 441 may query an HSS to determine an APN indicating the SID associated with eNodeB (SID 1) 420 and the BID associated with credit card system (BID 1) 430. LTE core network (MME 2) 441 may also order a P-GW or PCRF to use the SID associated with eNodeB (SID 1) 420 and the BID associated with home credit card system (BID 1) 430 for a media session. In this example, LTE core network (MME 2) 441 then attaches to credit card system (BID 1) 430. In response, UE 401 receives LTE SIB data characterizing SID 1 and BID 1 from eNodeB (SID 1) 420.

UE 401 then processes the LTE SIB data characterizing SID 1 and BID 1 in combination with the user-priority for the network names and the accounting names to determine SID 2 and BID 1 for eNodeB (SID 2) 421. In response, UE 401 wirelessly attaches to LTE core network (MME 3) 442 over eNodeB (SID 2) 421. In response, LTE core network (MME 3) 442 attaches to credit card system (BID 1) 430.

LTE core network (MME 3) 442 can then transfer billing information to credit card system (BID 1) 430. In some examples, the LTE core network containing an MME may be the same and may have previously attached to a user preferred billing system.

UE 401 then graphically displays the second network names for second eNodeB (SID 2) 421 and the accounting names for credit card system (BID 1) 430 to the user. UE 401 wirelessly exchanges user data with LTE core network (MME 3) 442 over eNodeB (SID 2) 421 while being billed to credit card system (BID 1) 430.

Figure 7:
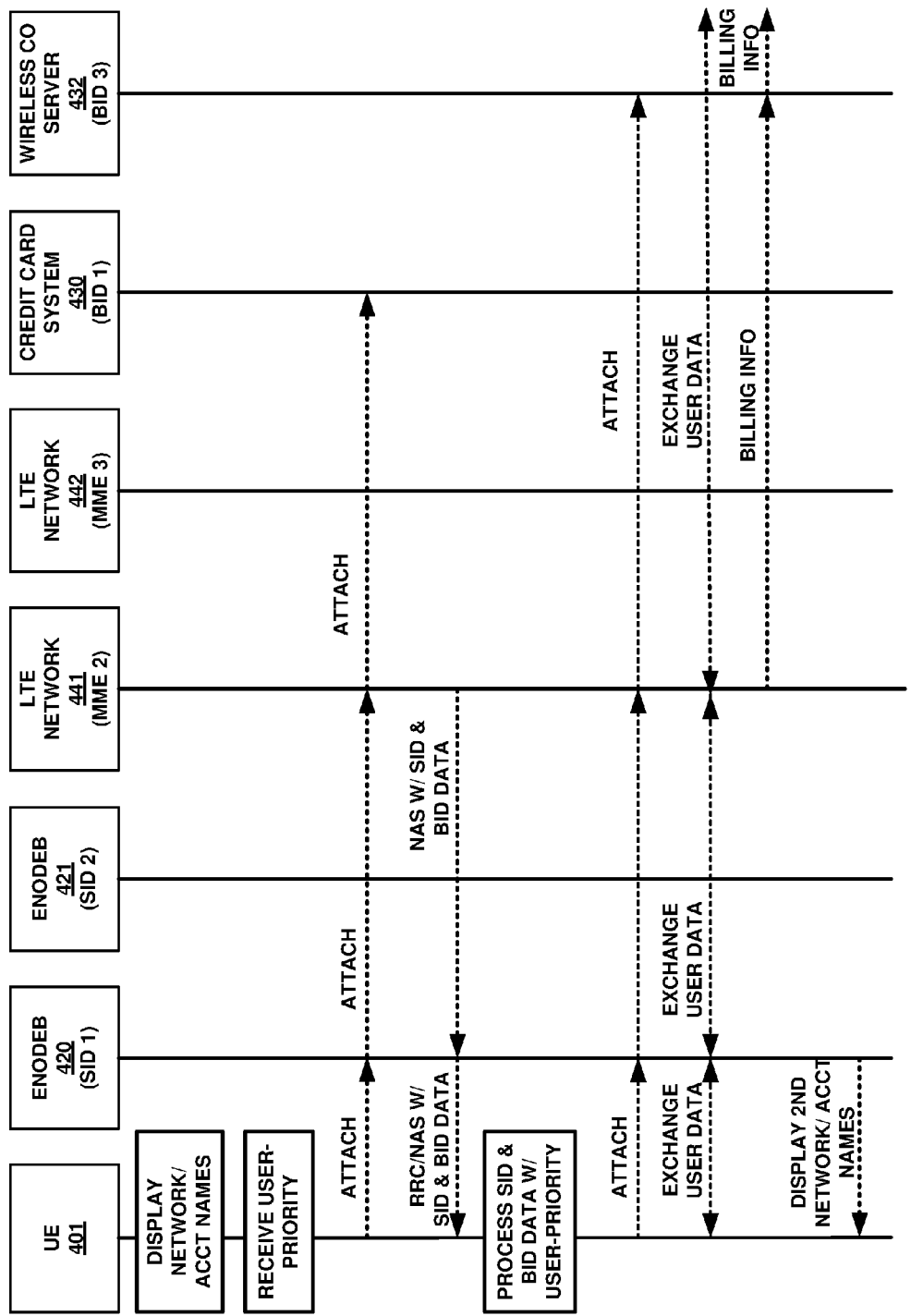

FIG. 7 is a sequence diagram illustrating an example embodiment of the operation of communication system 400 to control wireless communication access systems individually identified by network names and SIDs and to control data communication accounting systems individually identified by accounting names and by BIDs. First, UE 401 graphically displays the network names and the accounting names to the user. In response, UE 401 receives user inputs indicating a user-priority for the network names and the accounting names.

Similar to the illustration in FIG. 6, in FIG. 7 UE 401 wirelessly attaches to LTE core network (MME 2) 441 via eNodeB (SID 1) 420. Although not shown in the illustration, LTE core network (MME 2) 441 may query an HSS to determine an APN indicating the SID associated with eNodeB (SID 1) 420 and the BID associated with credit card system (BID 1) 430. LTE core network (MME 2) 441 may also order a P-GW or PCRF to use the SID associated with eNodeB (SID 1) 420 and the BID associated with home credit card system (BID 1) 430 for a media session. In this example, LTE core network (MME 2) 441 then attaches to credit card system (BID 1) 430.

In response, UE 401 receives an LTE RRC establishment cause indicating a SID and BID translation request from eNodeB (SID 1) 420. UE 401 also receives LTE NAS file containing data characterizing SID 1 and BID 1 from LTE core network (MME 2) 441 over eNodeB (SID 1) 420. UE 401 then processes the LTE RRC establishment cause and LTE NAS file containing data characterizing SID 1 and BID 1 in combination with the user-priority for the network names and the accounting names to determine SID 1 and BID 3 for eNodeB (SID 1) 420. It should be noted that although eNodeB (SID 1) 420 may be associated with the user-priority, the BID may be different.

Still referring to FIG. 7, UE 401 wirelessly attaches to LTE core network (MME 2) 441 over eNodeB (SID 1) 420. In response, LTE core network (MME 2) 441 attaches to wireless company system (BID 3) 432. LTE core network (MME 2) 441 can then transfer billing information to wireless company system (BID 3) 432 instead of credit card system (BID 1) 430. In this example, the preferred LTE core network containing the required MME is the same and may have previously attached to UE 401.

UE 401 then graphically displays the network name for eNodeB (SID 1) 430 and the second accounting name for wireless company system (BID 3) 432 to the user. UE 401 wirelessly exchanges user data with LTE core network (MME 2) 441 over eNodeB (SID 1) 420 while being billed to wireless company system (BID 3) 432.

Figure 8:
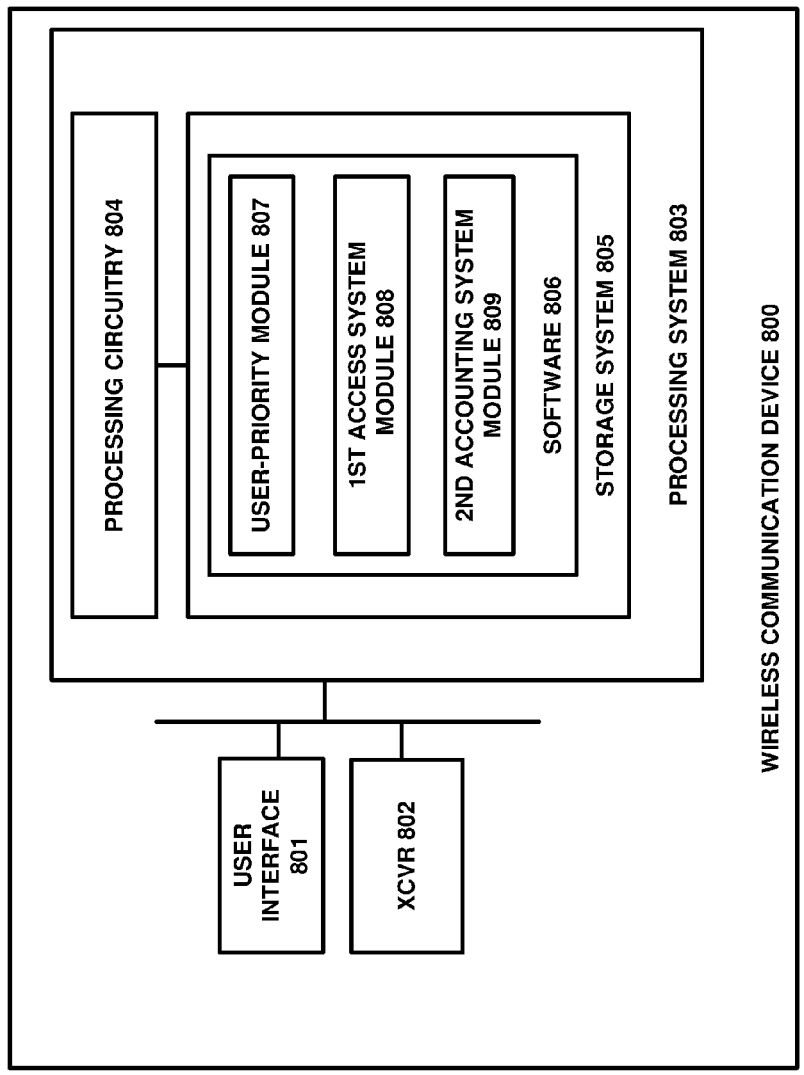
FIG. 8 illustrates a wireless communication device to control wireless communication access systems individually identified by network names and by SIDs and to control data communication accounting system individually identified by accounting names and by BIDs.

FIG. 8 illustrates wireless communication device 800 to control wireless communication access systems individually identified by network names and by SIDs and to control data communication accounting system individually identified by accounting names and by BIDs. Wireless communication device 800 is an example of wireless communication device 101 and UE 401, although wireless communication device 101 and UE 401 may use alternative configurations and operations. Wireless communication device 800 includes user interface 801, communication transceiver 802, and data processing system 803. Data processing system 803 is linked to user interface 801 and communication transceiver 802.

User interface 801 comprises components that interact with a user such as a keyboard, display screen, microphone, touch pad, or some other user input/output apparatus. User interface 801 graphically displays network names and accounting names, and responsively, receives user inputs indicating a user-priority for the network names and the accounting names. User interface 801 also graphically displays the second one of the network names for the second one of the wireless communication access systems.

Communication transceiver 802 comprises communication components, such as antennas, ports, amplifiers, filters, modulators, signal processors, and the like. Communication transceiver 802 wirelessly attaches to a first one of the wireless communication access systems having a first one of the network names and a first one of the SIDs, and responsively receives network data characterizing the SIDs and the BIDs. Communication transceiver 802 also wirelessly attaches to the second one of the wireless communication access systems having a second one of the SIDs and wirelessly exchanges user data with the second one of the wireless communication access systems.

Data processing system 803 includes processing circuitry 804 and storage system 805 that stores software 806. Processing circuitry 804 comprises a microprocessor and other circuitry that retrieves and executes software 806 from storage system 805. Storage system 805 comprises a non-transitory storage medium, such as a disk drive, flash drive, data storage circuitry, or some other memory apparatus. Software 806 comprises computer programs, firmware, or some other form of machine-readable processing instructions. Software 806 includes user-priority module 807, wireless communication access systems module 808, and data communication accounting systems module 809. Software 806 may further include an operating system, utilities, drivers, network interfaces, applications, or some other type of software. When executed by processing circuitry 804, software 806 directs processing system 803 to operate wireless communication device 800 as described herein.

In particular, when executed by processing circuitry 804, user-priority module 807 directs processing circuitry 804 to graphically display network names and accounting names and receive user inputs indicating a user-priority for the network names and accounting names. When executed by processing circuitry 804, first wireless communication access systems module 808 direct processing circuitry 804 to wirelessly attach to a first one of a wireless communication access systems having a first one of the network names and a first one of the SIDs and responsively receive network data characterizing the SIDs and the BIDs.

When executed by processing circuitry 804, second wireless communication access systems module 809 direct processing circuitry 804 to digitally process the network data characterizing the SIDs and the BIDs in combination with the user-priority for the network names and the accounting names to determine a second one of the SIDs for a second one of the wireless communication access systems. When executed by processing circuitry 804, second wireless communication access systems module 809 also direct processing circuitry 804 to wirelessly attach to the second one of the wireless communication access systems and to exchange user data with the second one of the wireless communication access systems. When executed by processing circuitry 804, second wireless communication access systems module 809 also directs processing circuitry 804 to graphically display the second one of the network names for the second one of the wireless communication access systems.

Referring back to FIG. 1, WCD 101 could be a phone, tablet computer, media player, intelligent machine, or some other apparatus having a wireless transceiver. WCD 101 includes antennas, modulators, processing circuitry, memory devices, software, and bus interfaces. The processing circuitry comprises transistors, registers, and signal paths. The memory devices comprise flash drives, disc drives, read-only circuitry, or some other data storage media.

Still referring to FIG. 1, user interface 110 comprises components that interact with a user, such as a keyboard, display screen, microphone, touch pad, or some other user interface component. Data processing system 111 may include general purpose central processing units, microprocessors, application specific processors, logic devices, and any other type of processing device. Wireless communication transceiver 112 comprises communication components, such as antennas, ports, amplifiers, filters, modulators, signal processors, and the like.

Still referring to FIG. 1, wireless link 140 communicates over air, space, or some other material that transports media. Wireless link 140 may use various protocols, such as Code Division Multiple Access (CDMA), Evolution Data Only (EVDO), Global System for Mobile Communication (GSM), Long Term Evolution (LTE), Wireless Fidelity (WIFI), High Speed Packet Access (HSPA), Worldwide Interoperability for Microwave Access (WIMAX), Internet Protocol (IP), or some other wireless communication formats—including combinations thereof. Wireless link 140 could be a direct link or may include intermediate networks, systems, or devices.

Still referring to FIG. 1, communication link 141 communicates over glass, metal, wirelessly, or some other material that transports media. Communication link 141 may use various protocols, such as Synchronous Optical Networking (SONET), Data Over Cable Service Interface Specification (DOCSIS), Worldwide Interoperability for Microwave Access (WIMAX), Time Division Multiplex (TDM), Ethernet, communication signaling, or some other communication format—including combinations thereof. Communication link 141 could be a direct link or may include intermediate networks, systems, or devices.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a wireless communication network to enable a user to select from a plurality of data communication accounting systems, the method comprising:

a wireless communication device receiving user inputs indicating a user-prioritized list of accounting names;
the wireless communication device wirelessly attaching to a wireless access system and the wireless access system transferring network data characterizing Billing Identifiers (BIDs) to the wireless communication device;
the wireless communication device processing the network data characterizing the BIDs in combination with the user-prioritized list of the accounting names to select one of the BIDs and transferring the selected one of the BIDs to the wireless access system;
the wireless access system directing a gateway system to use the selected one of the BIDs for the wireless communication device; and
the gateway system exchanging user data for the wireless communication device and responsively transferring usage data for the wireless communication device for delivery to one of the data communication accounting systems that is identified by the selected one of the BIDs.

2. The method of claim 1 wherein the wireless access system transferring the network data characterizing the BIDs comprises a Long Term Evolution (LTE) evolved Node B (eNodeB) broadcasting the network data in an LTE System Information Block (SIB).

3. The method of claim 1 wherein the wireless access system transferring the network data characterizing the BIDs comprises a Long Term Evolution (LTE) Mobility Management Entity (MME) transferring the network data in LTE Non-Access Stratum (NAS) data.

4. The method of claim 1 wherein the wireless communication device transferring the selected BID to the wireless access system comprises the wireless communication device transferring the selected BID in Long Term Evolution (LTE) Non-Access Stratum (NAS) data to an LTE Mobility Management Entity (MME).

5. The method of claim 1 wherein the wireless access system directing the gateway system to use the selected BID comprises a Long Term Evolution (LTE) Mobility Management Entity (MME) signaling an LTE gateway system to use the selected BID.

6. The method of claim 1 wherein the wireless communication device attaching to the wireless access system comprises the wireless communication device transferring a BID request in Long Term Evolution (LTE) Radio Resource Control (RRC) attachment signaling to an LTE evolved Node B (eNodeB).

7. The method of claim 1 wherein the wireless communication device attaching to the wireless access system comprises the wireless communication device transferring a BID request in Long Term Evolution (LTE) Non-Access Stratum (NAS) data to an LTE Mobility Management Entity (MME).

8. The method of claim 1 wherein the wireless communication device attaching to the wireless access system further comprises the wireless access system selecting a Long Term Evolution (LTE) Access Point Name (APN) for the wireless communication device based on the selected BID.

9. The method of claim 1 further comprising the wireless communication device graphically displaying the accounting names to prompt for the user-prioritized list of the accounting names.

10. The method of claim 1 further comprising the wireless communication device graphically displaying network names to prompt for a user-prioritized list of the network names.

11. A wireless communication network to enable a user to select from a plurality of data communication accounting systems, the method comprising:

a wireless communication device configured to receive user inputs indicating a user-prioritized list of accounting names;

the wireless communication device configured to wirelessly attach to a wireless access system;

the wireless access system configured to transfer network data characterizing Billing Identifiers (BIDs) to the wireless communication device;

the wireless communication device configured to process the network data characterizing the BIDs in combination with the user-prioritized list of the accounting names to select one of the BIDs and transfer the selected one of the BIDs to the wireless access system;

the wireless access system configured to direct a gateway system to use the selected one of the BIDs for the wireless communication device; and the gateway system configured to exchange user data for the wireless communication device and responsively transfer usage data for the wireless communication device for delivery to one of the data communication accounting systems that is identified by the selected one of the BIDs.

12. The wireless communication network of claim 11 wherein the wireless access system comprises a Long Term Evolution (LTE) evolved Node B (eNodeB) configured to broadcast the network data in an LTE System Information Block (SIB).

13. The wireless communication network of claim 11 wherein the wireless access system comprises a Long Term Evolution (LTE) Mobility Management Entity (MME) configured to transfer the network data in LTE Non-Access Stratum (NAS) data.

14. The wireless communication network of claim 11 wherein the wireless communication device is configured to transfer the selected BID in Long Term Evolution (LTE) Non-Access Stratum (NAS) data to an LTE Mobility Management Entity (MME).

15. The wireless communication network of claim 11 wherein the wireless access system comprises a Long Term Evolution (LTE) Mobility Management Entity (MME) configured to signal an LTE gateway system to use the selected BID.

16. The wireless communication network of claim 11 wherein the wireless communication device is configured to transfer a BID request in Long Term Evolution (LTE) Radio Resource Control (RRC) attachment signaling to an LTE evolved Node B (eNodeB).

17. The wireless communication network of claim 11 wherein the wireless communication device is configured to transfer a BID request in Long Term Evolution (LTE) Non-Access Stratum (NAS) data to an LTE Mobility Management Entity (MME).

18. The wireless communication network of claim 11 wherein the wireless access system is further configured to select a Long Term Evolution (LTE) Access Point Name (APN) for the wireless communication device based on the selected BID.

19. The wireless communication network of claim 11 wherein the wireless communication device is configured to graphically display the accounting names to prompt for the user-prioritized list of the accounting names.

20. The wireless communication network of claim 11 wherein the wireless communication device is configured to graphically display network names to prompt for a user-prioritized list of the network names.

* * * * *